United States Patent
Knappe et al.

(10) Patent No.: US 12,038,739 B2
(45) Date of Patent: Jul. 16, 2024

(54) METHOD FOR THE OFFLINE AND/OR ONLINE IDENTIFICATION OF A STATE OF A MACHINE TOOL, AT LEAST ONE OF ITS TOOLS OR AT LEAST ONE WORKPIECE MACHINED THEREIN

(71) Applicant: Siemens Aktiengesellschaft, Munich (DE)

(72) Inventors: Dominik Knappe, Hamm (DE); Arthur Waschew, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/029,014

(22) PCT Filed: Sep. 22, 2021

(86) PCT No.: PCT/EP2021/076019
§ 371 (c)(1),
(2) Date: Mar. 28, 2023

(87) PCT Pub. No.: WO2022/069308
PCT Pub. Date: Apr. 7, 2022

(65) Prior Publication Data
US 2023/0393559 A1 Dec. 7, 2023

(30) Foreign Application Priority Data
Sep. 29, 2020 (EP) .................................... 20198969

(51) Int. Cl.
*G05B 19/416* (2006.01)
*B23Q 17/09* (2006.01)
(52) U.S. Cl.
CPC ....... *G05B 19/416* (2013.01); *B23Q 17/0961* (2013.01); *B23Q 17/0976* (2013.01); *B23Q 17/0995* (2013.01)
(58) Field of Classification Search
None
See application file for complete search history.

(56) References Cited

U.S. PATENT DOCUMENTS

2021/0312335 A1  10/2021  Deichmann

FOREIGN PATENT DOCUMENTS

DE  10 2007 048 961 A1  4/2009
EP   3 614 220 A1  2/2020
(Continued)

OTHER PUBLICATIONS

Quintana, Guillem et al.; "Using kernel data in machine tools for the indirect evaluation of surface roughness in vertical milling operations",Robotics and Computer Integrated Manufacturing, Elsevier Science Publishers BV., Barking, GB,Bd. 27, Nr. 6, May 24, 2011 (May 24, 2011), pp. 1011-1018, XP028234861,ISSN: 0736-5845, DOI: 10.1016/J.RCIM.2011.05.005[gefunden am May 31, 2011].

(Continued)

*Primary Examiner* — Sean Shechtman
(74) *Attorney, Agent, or Firm* — Henry M. Feiereisen LLC

(57) ABSTRACT

A machine tool includes a tool and a workpiece machined by the tool, and sensors configured to detect a position of the tool and/or the tool holder holding the tool in a spatially and time resolved manner A method for offline and/or online identification of a state of the machine tool includes: a) detecting or providing positions $p_i$ of the tool and/or of the tool holder at a series of points in time i, i=1 . . . n; b) determining for the series of points in time i a series of position changes $\Delta m_i$ according to the formula $\Delta m_i = p_i/p_{i-1}$ and a series of speed changes $\Delta v_i$ according to the formula $\Delta v_i = v_i/v_{i-1}$ with $$v_i = \frac{P_i - P_{i-1}}{t_i - t_{i-1}}$$

and formula $$v_{i-1} = \frac{P_{i-1} - P_{i-2}}{t_{i-1} - t_{i-2}};$$

(Continued)

c) identifying the state of the tool, the tool holder, the machine tool and/or the workpiece machined in the machine tool based on the position changes $\Delta m_i$ and the speed changes $\Delta v_i$.

11 Claims, 4 Drawing Sheets

(56) References Cited

FOREIGN PATENT DOCUMENTS

| | | |
|---|---|---|
| WO | WO 2006-037137 A1 | 4/2006 |
| WO | WO 2020-038815 A1 | 2/2020 |

OTHER PUBLICATIONS

Zhu, Lida et al.; "Recent progress of chatter prediction, detection and suppression in milling",Mechanical Systems and Signal Processing, Elsevier, Amsterdam, NL,Bd. 143, Mar. 31, 2020 (Mar. 31, 2020), XP086151299,ISSN: 0888-3270, DOI: 10.1016/J.YMSSP. 2020.106840[gefunden am Mar. 31, 2020].

PCT International Search Report and Written Opinion of International Searching Authority dated Jan. 12, 2022 corresponding to PCT International Application No. PCT/EP2021/076019 filed Sep. 22, 2021.

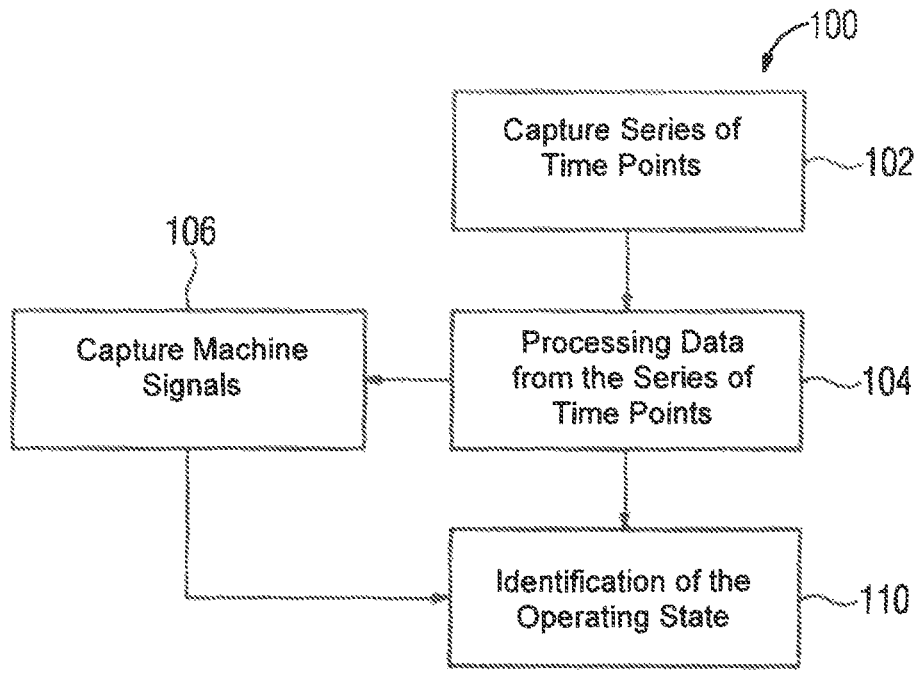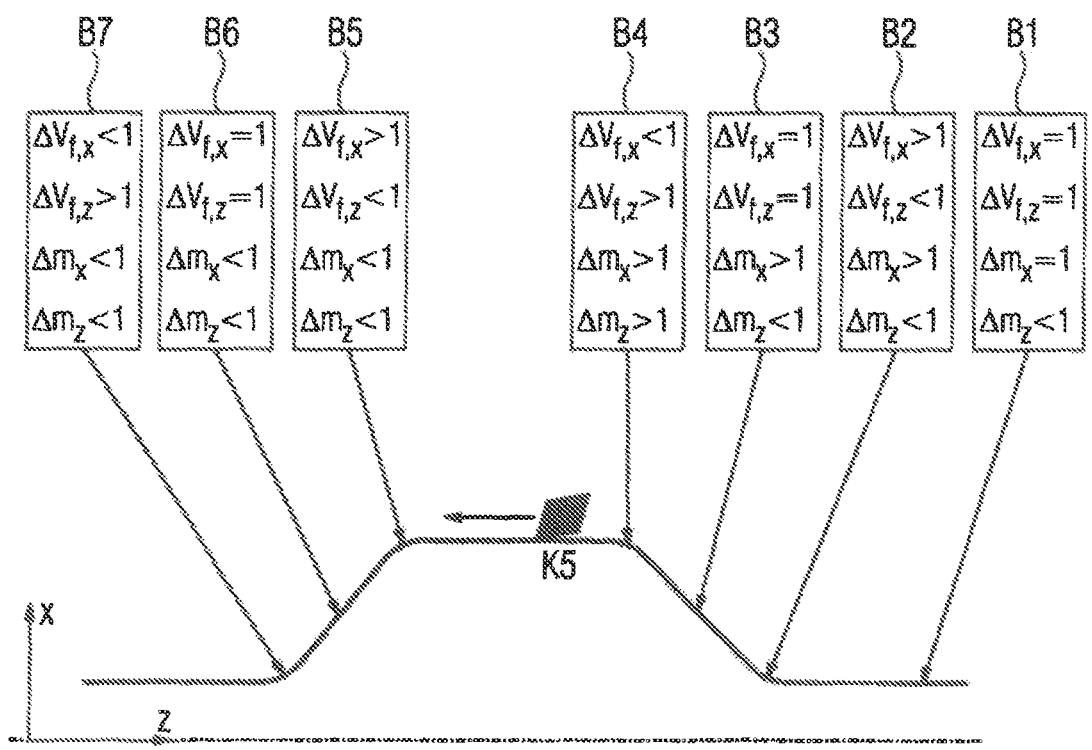

Positions ≠ 0: U = [0; 0; 2; 2; 5; 0; 0; 0; 6; 7; 7; 7; 3; 6; 6; 6; 6]
                  1  2  3  4  5  6  7  8  9 10 11 12 13 14 15 16 17

Spacings of the positions: t = [3; 4; 5; 9; 10; 11; 12; 13; 14; 15; 16; 17]
                   1  2  3  4   5   6   7   8   9  10  11  12 d = [1; 1; 4; 1; 1; 1; 1; 1; 1; 1; 1; 1]
     1  2  3  4  5  6  7  8  9 10 11 12

$d(3) > 1$ $b = e + 1 = 3 + 1 = 4$

METHOD FOR THE OFFLINE AND/OR ONLINE IDENTIFICATION OF A STATE OF A MACHINE TOOL, AT LEAST ONE OF ITS TOOLS OR AT LEAST ONE WORKPIECE MACHINED THEREIN

CROSS-REFERENCES TO RELATED APPLICATIONS

This application is the U.S. National Stage of International Application No. PCT/EP2021/076019, filed Sep. 22, 2021, which designated the United States and has been published as International Publication No. WO 2022/069308 A1 and which claims the priority of European Patent Application, Serial No. 20198969.6, filed Sep. 29, 2020, pursuant to 35 U.S.C. 119(a)-(d).

BACKGROUND OF THE INVENTION

The invention relates to a method for the offline and/or online identification of a state of a machine tool, at least one of its tools or at least one workpiece processed therein, wherein the machine tool has at least one, preferably rotatable clamping apparatus for clamping a workpiece that is to be processed and at least one movable tool holder for positioning a tool held therein with which the workpiece can be processed, and sensors with which at least the position of the tool and/or of the tool holder can be detected in a spatially and time-resolved manner.

Machine tools, for example CNC machines, are nowadays equipped with a large number of sensors which can continuously detect the most varied of operating parameters. The time series established therewith for the operating parameters enable an analysis of the operating state of the machine tool. It is known from WO 2020/038815 A1, for example, to determine the state of an apparatus using a trained support vector machine. Therein, an operating parameter space is subdivided into classification volumes of which at least one identifies a normal state and at least one other identifies a fault state of the apparatus.

It is disadvantageous that for implementation there is a need, firstly, for a neural network and, secondly, for extensive training data, so that in the prior art a complex method is provided.

In addition, with the known method, different normal operating states of a machine tool can be determined only in a complex manner. Normal operating states are operating states in which the machine tool carries out the predetermined, i.e. programmed method steps as intended, and without faults. In principle, the normal operating states of a machine tool include the machining process as the main state and the return movement, travel of the tool holder for a tool change, standstill times or just idling times as subsidiary states, for example.

There are therefore only limited possibilities currently for establishing and analyzing in detail unprofitable non-productive times. In addition, individual sequences of one of the elements cannot be identified unambiguously and/or error free. Therein, an element of the machine tool should be understood as a component of the machine tool which can be moved in the machine tool. Therefore, the expression element in this application is a collective term which can be understood to cover, in detail, the tool and/or tools, their tool holders and the clamping apparatus for clamping the workpiece.

When testing the operating state on the basis of internal machine signals, a distinction can be made between the operation and a standstill of the machine tool. This is realized by way of the power consumption of the drive motors and changing position data of the tool holder and/or of the tool. However, non-productive times have previously been recorded at the machine merely on an estimated or manual basis. For a detailed and complete description of the operating state, a continuous documentation of all the events is needed.

It is thus an object of the invention to provide a method for offline and/or online identification of a state or a sequence of a machine tool, for example a CNC machine tool with which the operating states and/or sequences can be identified in a simple and efficient manner. At the same time, it is an object of the invention to provide an apparatus corresponding thereto.

SUMMARY OF THE INVENTION

These objects are achieved with the subject matter of the independent claims. Advantageous embodiments of the invention are the subject matter of the further claims and of the following description.

According to the invention, the operating state of a machine tool or a sequence of a travel, of at least one of its tools or of at least one workpiece processed therein is identifiable. The machine tool has at least one, preferably rotatable clamping apparatus for clamping a workpiece that is to be processed and at least one movable tool holder for positioning a tool held therein with which the workpiece can be processed, and sensors with which at least the position of the tool and/or of the tool holder can be detected in a spatially and time-resolved manner. For identification according to the invention, the following steps are carried out.

Firstly, for a series of successive time points i, where i=1 ... n, the positions P of the tool and/or of the tool holder are detected in a spatially and time-resolved manner. These time series of data can then be evaluated immediately after the detection, that is online, in accordance with steps b) and c). It is also possible to use the method according to the invention in accordance with the steps b) and c) for analysis of already completed operational phases of the machine tool. In this case, the data captured during these operational phases which is therefore historical is provided to the evaluation method described here subsequently, that is, offline.

The data from the sensors, present as time series at time points i relating to the positions of the tool and/or the tool holder is, in each case, converted in a first calculation step using $$\Delta m_i = \frac{P_i}{P_{i-1}} \qquad \text{eq. (1)}$$

into a series of position changes $\Delta m_i$ and using $$\Delta v_i = \frac{v_i}{v_{i-1}}, \text{ where} \qquad \text{eq. (2)}$$

$$v_i = \frac{P_i - P_{i-1}}{t_i - t_{i-1}} \text{ and } v_{i-1} = \frac{P_{i-1} - P_{i-2}}{t_{i-1} - t_{i-2}} \qquad \text{eq. (3) and eq. (4)}$$

into a series of speed changes $\Delta v_i$.

From these data series, the state of the tool, the tool holder, the machine tool and/or the workpiece processed in the machine tool can then be established.

The particular difference lies in the simplicity of the stated method which requires neither a complex transformation of the sensor data established and/or provided, not the training of a neural network however configured.

According to a particularly preferred embodiment of the method, the positions P are captured as coordinates $P_i(x_i, y_i, z_i)$ of a Cartesian coordinate system, stored and provided to the evaluation method. Therefore, according to the axes x, y, z of the coordinate system for the position changes, $\Delta m_i$ their respective components $\Delta m_{xi}$, $\Delta m_{yi}$, $\Delta m_{zi}$ and for speed changes $\Delta v_i$ their respective components $\Delta v_{xi}$, $\Delta v_{yi}$, $\Delta v_{zi}$ are determined. Such a method is based upon the coordinate system that is already used by the machine tool, so that an adaptation of the sensor data captured by the machine tool is not required. This supports a determination of the operating state in real time and enables a simpler implementation of the method.

Particularly preferably, the identified state is an operating state, in particular a normal operating state, which represents a movement of the tool and/or the tool holder, in particular for workpiece processing, for tool repositioning, in particular return movements, for a tool change and a rest phase of the tool and/or tool holder, in particular a standstill time and/or an idling, and/or corresponds to a deviation from the predetermined movement speed of the clamping apparatus, in particular override commands. In addition, with the method, where travel instances are concerned, individual operating states can be subdivided into a plurality of sequences with different significance. This is understood to mean, in particular, that the state "machining process" can be subdivided into the sequences "approach", "start of cut" in the sense of "the tool reaches and contacts the workpiece", "cutting sequence" in the sense of "the tool processes the workpiece" and "finish cut" in the sense of "the tool loses contact with the workpiece". This applies equally for other travel instances and movements of the elements.

Advantageously, further sensors detect electrical parameters of the drive motors of the machine tool. For example, the further sensors detect the electric current consumption and/or the electric supply voltage applied to the drive motors, by means of which, for example, the clamping apparatus is rotated and/or the tool holders are moved in the space. The characteristic curves and/or time series established thereby are then able to be analyzed in a further method step. For example, these characteristic lines or time series are combined with the previously established series of position changes and speed changes, so that in particular an analysis of the machining processes is possible. From this, fault operating states can also be established. Such findings enable, firstly, protection of the machine tool against consequential damage. Secondly, damage to the workpiece can be recognized and notified, so that a timely examination of the still unfinished workpiece is possible. By this means, an unnecessary further processing of a possibly no longer usable workpiece can be avoided, which improves the utilization factor of the machine tool, saves costs and accelerates the production of a series of workpieces.

Suitably, further data, in particular correction factors or tool parameters for determining the states, are provided in advance and utilized. Correction factors are, for example, values that are used for exact position determination of the cutting edge of a tool.

In an advantageous method step, the series of position changes and/or the series of speed changes are analyzed on the basis of the limit value consideration. Thus, for example, with the aid of the formula $$\mathrm{Lim}_{v_f} = \frac{\sum_{i=1}^{n} U_{v,f}(i)}{n} \pm \frac{\sqrt{\frac{\sum_{i=1}^{n}(U_{v,f}(i) - \overline{U_{v,f}(i)})^2}{n-1}}}{2}, \qquad \text{eq. (5)}$$

where U is a matrix which defines the position of the tool and/or the tool holder, it can be established whether either a tool change or a machining process is taking place.

A simple and efficient method of identification of the states exists if case distinctions are made in which it is tested whether the value in question for the position change $\Delta m_i$ and/or the speed change $\Delta v_i$, or one and/or more of their components is/are less than 1, equal to 1, greater than 1, or 0.

Suitably the series of position changes and/or speed changes are represented in a diagram as characteristic lines and/or in a data array, on the basis of which an analysis of the respective state takes place.

Particularly preferably, the method is used for recognizing an overloading of one of the drives of the machine tool, for recognizing wear on the machine tool and/or on the tool, for recognizing a manufacturing or workpiece fault and/or for recognizing process instabilities, in particular judder, i.e. a regenerative effect.

Suitably, the method described above and/or its preferred embodiments are computer-implemented. As a consequence, the invention also includes an apparatus for data processing, comprising means for carrying out the method or for carrying out a preferred embodiment. The invention further includes a computer program product comprising commands which, on execution of the program by a computer cause said computer to carry out the steps of the method or a preferred embodiment. Also included by the invention is a computer-readable medium comprising commands which, on execution by a computer cause said computer to carry out the steps of the method or a preferred embodiment.

The description of preferred embodiments of the invention given above contains numerous features which are disclosed in the individual dependent claims, sometimes severally grouped together. These features can, however, also be considered individually and grouped into further useful combinations. In particular, these features are capable of being combined individually and in any desired suitable combination with the method according to the invention, the apparatus according to the invention for data processing and the computer-readable medium according to the invention. Furthermore, method features can be regarded as a property of a corresponding apparatus unit.

BRIEF DESCRIPTION OF THE DRAWING

The above-described properties, features and advantages of the invention and the manner in which these are achieved will now be described more clearly and explicitly in relation to the following description of the exemplary embodiments of the invention, which are described in greater detail by reference to the drawings. The exemplary embodiments serve to explain the invention and do not limit the invention to the combinations of features given therein, also not in relation to functional features. In addition, features of each exemplary embodiment which are suitable therefor can also be considered explicitly in isolation, removed from an exemplary embodiment, introduced into another exemplary embodiment for its enhancement and combined with any of the claims.

It is shown in:

FIG. 3 a flow diagram for the method for identifying states of a machine tool,

FIG. 4 the graphical representation of a machining process,

DETAILED DESCRIPTION OF PREFERRED EMBODIMENTS

Figure 1:
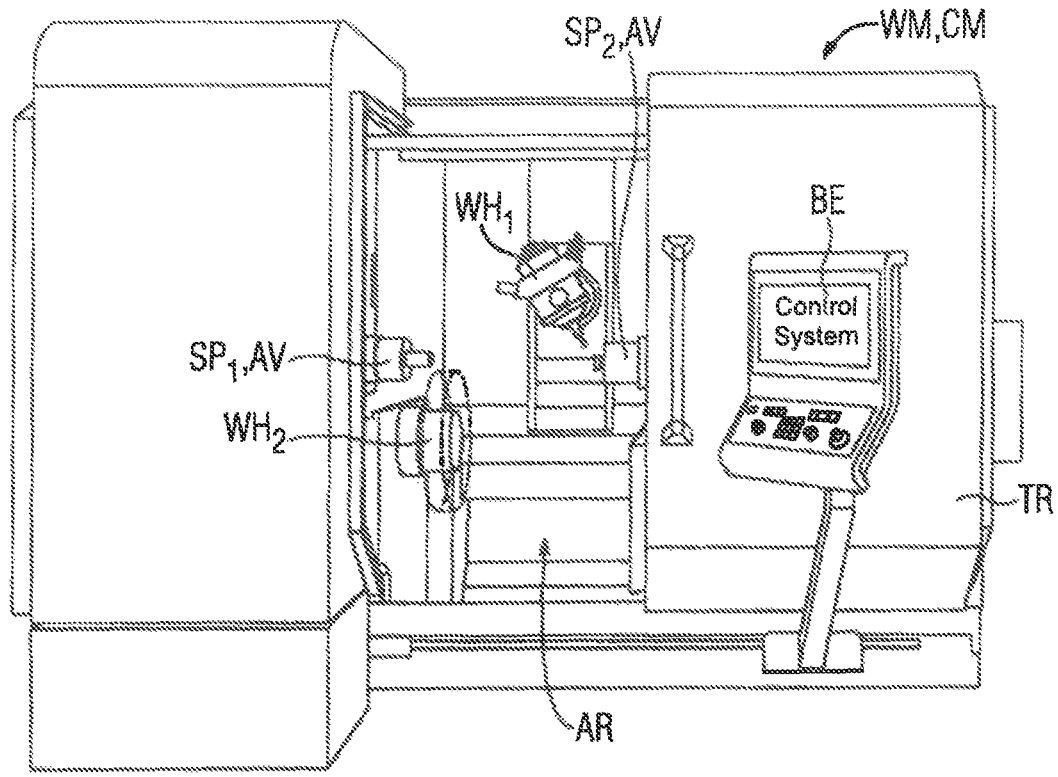
FIG. 1 a schematic representation of a machine tool.

In all the drawings, identical features are provided with the same reference characters.

Figure 2:
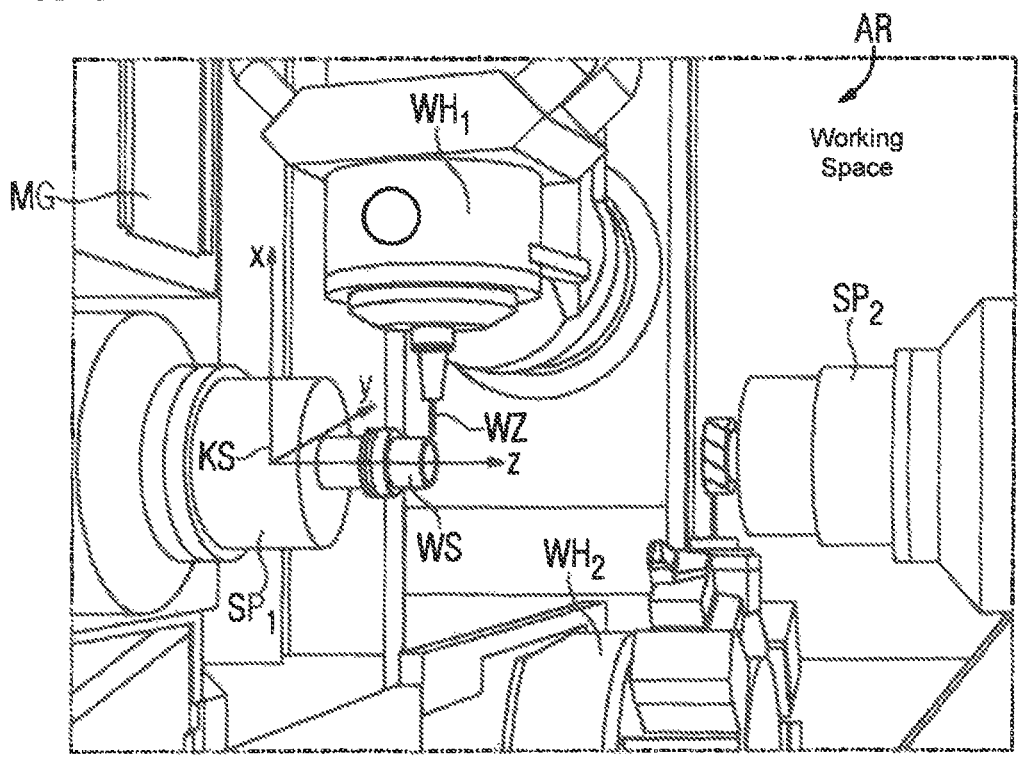
FIG. 2 the working space of the machine tool shown in FIG. 1.

FIG. 1 shows, by way of example as a machine tool WM, a turning and milling CNC machine CM. The machine tool WM comprises a working space AR, which can be closed off by a sliding door TR, in which two spindles SP arranged opposite one another, a main spindle $SP_1$ and a subsidiary spindle $SP_2$ as clamping apparatuses AV, AV are provided for clamping a workpiece WS that is to be processed (FIG. 2). Also provided in the working space AR are two movable tool holders $WH_1$, $WH_2$, each of which can receive a plurality of tools (not shown here). The machine tool WM further comprises a control system BE for programming, controlling and monitoring its elements.

FIG. 2 shows the working space AR and the elements arranged therein in detail. The two spindles $SP_1$ and $SP_2$ are arranged concentrically to one another and are arranged to be rotatable about their common longitudinal axis. They also each comprise a clamping apparatus AV with which a workpiece WS to be processed can be rotated. The machine tool WM further possesses two tool holders $WH_1$ and $WH_2$ which are spatially displaceable in all three spatial directions. The upper tool holder $WH_1$ comprises, as a motorized milling spindle, just three stations whereas the tool holder $WH_2$ arranged below, as a tool revolver, is equipped with a plurality of stations.

In order to detect the positions, the control system BE of the machine tool WM uses a virtual Cartesian coordinate system KS with the three machine axes x, y and z arranged orthogonally to one another. The two spindles $SP_1$ and $SP_2$ and the clamping apparatuses AV arranged thereon are both rotatable about the z-axis and are also displaceable along the z-axis so that workpieces can be handed over, without support by a user, from the subsidiary spindle to the main spindle or vice versa.

A magazine space MG which, in the representation shown is closed by a magazine door borders on the working space AR. A larger number of tools WZ, i.e. drills, mills and suchlike is arranged in the magazine space MG which, with the magazine door open can be grasped by the upper tool holder $WH_1$ and replaced therein or can be returned.

During its operation, the machine tool WM can be in different states, that is, operating states. A distinction should herein be made between, firstly, faulty operating states and, secondly, intended operating states, so-called normal operating states. An example of a faulty operating state is the state "tool break". Other operating states indicating a fault are conceivable. Intended operating states, by contrast, for example "machining process", "idling", "override command" or "tool change" can be represented. An override command is understood to be a manual intervention by a user of the machine tool WM which accelerates or slows down the programmed sequence of a workpiece processing. Further intended operating states can also be sequences of the aforementioned operating states if, effectively, subsections thereof are (to be) recognized. By means of the operating states recognized by the method, subsequently an analysis and, where relevant, an optimization of the processing of the workpiece WS is possible.

The workpiece can also be present in different states. With regard to the workpiece WS, by means of the method, a spatially-resolved identification of possible production errors is, for example, possible to reduce the effort for quality assurance.

In order to establish the states, the machine tool WM is equipped with a plurality of sensors (not shown). With some of these sensors, the positions of the tool and/or the tool holder or even the clamping apparatuses can be established in a spatially and time-resolved manner. Typically, the detection of the position, i.e. the spatial coordinates P(x, y, z) of the clamping apparatuses AV and/or of the workpiece WS clamped therein, of the tool WZ and/or of the tool holders $WH_1$, $WH_2$ takes place for each machine axis separately by way of correspondingly suitable sensors.

The position of the cutting edges of the tools WZ can, for example, also be established via the position of the tool holder in that the tool holder position is enhanced with previously provided data regarding the size of the tool in question. Similarly it is possible, for determining correction data, to measure the position of the cutting edges of the tool in the machine tool WM automatically. Further sensors are able to detect continuously the electric currents and supply voltages of the drive motors (not shown) of the machine tool by which the respective rotatable and/or displaceable elements can be driven, i.e. rotated and/or repositioned.

Thus, the signals from these sensors contain data which can be captured during machine stoppages, tool changes, idling times, rapid transits, acceleration effects, the start of cut sequence and the actual machining process. The recorded data signals thus represent, inter alia, position data, drive parameters and drive power levels, correction factors or tool parameters.

The method proposed for identifying states is shown schematically in FIG. 3, wherein further concepts necessary for characterization are defined in the following:

The feed rate of an element can be calculated from the product of the existing feed (f) along the machine axis under observation and the associated rotary speed n, hereinafter represented, merely by way of example, for the x-axis:

$$v_{f,x} = f_x * n \tag{1}$$

For the position change of the element being observed that is necessary for state identification, the vector $\Delta m$ is introduced, defined as the ratio, i.e. quotient, of its position at an arbitrary time point i to its previous position, therefore at the time point i−1. By way of example, this is set out in Equation 2 for the x-coordinate of the relevant element.

$$\Delta m_x = \frac{x(i)}{x(i-1)} \tag{2}$$

The method offers the possibility of being able to use the method offline and online.

Furthermore, for the feed rate change in, for example, the x-direction, the relation shown in Equation 3 applies:

$$\Delta v_{f,x} = \frac{v_{f,x}(i)}{v_{f,x}(i-1)} \quad (3)$$

wherein the speeds are established in accordance with $$v_i = \frac{P_i - P_{i-1}}{t_i - t_{i-1}} \text{ and } v_{i-1} = \frac{P_{i-1} - P_{i-2}}{t_{i-1} - t_{i-2}}. \quad (4), (5)$$

In a first method step 102 of the method 100 according to the invention, at a series of time points, the respective current position of the tool WZ and/or of the tool holder $WH_1$, $WH_2$ are captured and/or provided as data. The processing of this data which takes place in a second method step 104 according to the above Equations (1) to (5) can take place immediately as it arises, which enables an online identification of the state. Where a calculation and state identification for capture of the data take place temporally offset, this is regarded as an offline identification of the state. In a last method step 110, the identification of the state of the tool, the tool holder, the machine tool and/or the workpiece processed in the machine tool takes place on the basis of the previously established and/or provided position changes and speed changes.

In principle, a distinction can be made between different cases, per machine axis and per element, for the position changes and the speed changes. Therein, it should firstly only be established in which directions the element moves. This can be established with the aid of Table 1 below. Otherwise, the position changes and the speed changes represent nothing other than the quotients of the raw data.

TABLE 1

Meanings based upon the quotients

| Case | Meaning |
| --- | --- |
| $\Delta m_x < 1$ | Element travels in the negative x-direction |
| $\Delta m_x = 1$ | Element travels at a constant x-level |
| $\Delta m_x > 1$ | Element travels in the positive x-direction |
| ... | ... |
| $\Delta m_z < 1$ | Element travels in the negative z-direction |
| $\Delta m_z = 1$ | Element travels at a constant z-level |
| $\Delta m_z > 1$ | Element travels in the positive z-direction |
| $\Delta v_{f,x} < 1$ | Feed rate in x-direction decreasing |
| $\Delta v_{f,x} = 1$ | Feed rate in x-direction constant |
| $\Delta v_{f,x} > 1$ | Feed rate in x-direction increasing |
| ... | ... |
| $\Delta v_{f,z} < 1$ | Feed rate in z-direction decreasing |
| $\Delta v_{f,z} = 1$ | Feed rate in z-direction constant |
| $\Delta v_{f,z} > 1$ | Feed rate in z-direction increasing |

Subsequently, on the basis of a combined consideration of two or more cases of the state, in particular the operating state of the machine tool at the observed time point of the series of time points can be established.

Below, by way of example, some conditions are listed schematically on the basis of which the method can identify different operating states.

a) Identification of return movements:
   If more than one machining process is carried out on a workpiece, then the tool must be returned to the starting point. In order to identify this state, one of the three conditions shown below must be met:

$\Delta m_z > 1 \& \Delta m_x > 1$ $\Delta m_z = 1 \& \Delta m_x > 1$ $\Delta m_z > 1 \& \Delta m_x = 1$ b) Identification of standstills and idling times:
   In the event that, during the course of the processing, the machine tool is placed manually into an idling state, for example by a user, so that despite the rotating main spindle, no processing takes place, the condition below applies. This also applies for standstill times with a static main spindle $\Delta v_{f,x} = \Delta v_{f,z} = \Delta v_{f,y} = 0$ c) Identification of idling and/or standstill:
   A distinction between idling and standstill can be undertaken via the spindle rotary speed which is additionally read out from the control system BE. If the rotary speed of the clamping apparatus AV holding the workpiece WS is not equal to 0, idling is taking place.

d) Identification of override commands:
   The control system BE of the machine tool returns manually executed override commands. These can be read out and subsequently processed. If the conditions of FIG. 4 are met, they are assigned to the machining process. Override commands do not change the conditions of FIG. 4. It is important to note that, depending upon the command, the conditions for identification of standstill times and idling times can also apply.

e) Identification of the actual machining process and establishment of the individual cutting sequences:
   For the identification of the individual cutting sequences during continuous processing, in the first step, the signal of the feed rates of the axes is to be taken into account. In order to ensure that even low feed rates are identified as such during the mechanical processing, the possibility exists of squaring the results and then rounding them to the nearest natural number, including 0.

In the next step, the position change and the change in the feed rate of the respective axes are determined with a high level of accuracy. This has the effect that small deviations can be identified.

Subsequently, a further case distinction has to be carried out so that the cutting sequence currently being performed can be identified. The possible cases and the respective conditions are represented in FIG. 4. The conditions set out apply also for grooving and internal machining of the workpiece.

In the exemplary embodiment shown in FIG. 4, for example, the first tool holder $WH_1$ travels out of its rest position in the negative z-direction. The method is able to recognize this state with the aid of the quotients given. For this purpose, all the conditions cited in B1 must be met:

$\Delta v_{f,x} = 1$ $\Delta v_{f,x} = 1$ $\Delta m_x = 1$ $\Delta m_z < 1$

With advancing time, the tool holder $WH_1$ is additionally moved in the positive x-direction so that all the conditions B2 are met. On first occurrence of sensor data which meet the conditions B4, the method recognizes the start of a machining process: the start of cut sequence. The end of the machining process, the finish cut sequence, is recognized if the conditions B4 are no longer met, but rather the conditions B5 are.

Figures 5, 6:
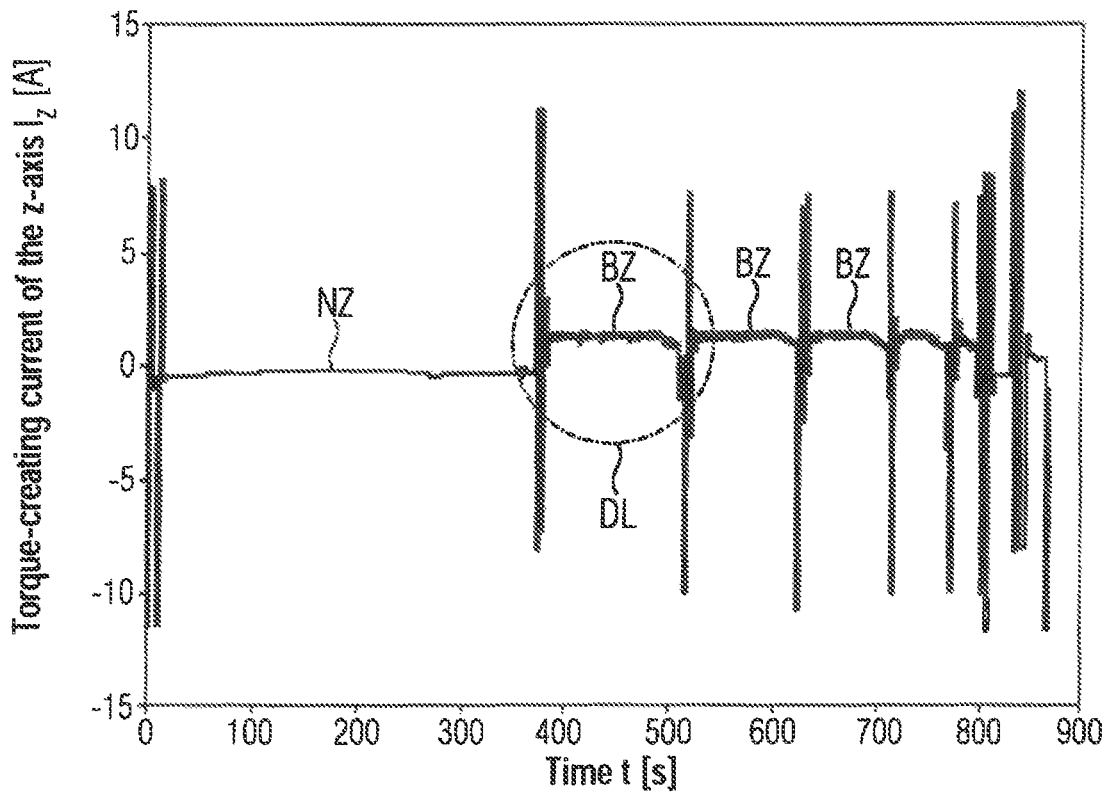
FIG. 5 a matrix U with a series of position changes.
FIG. 6 a characteristic line of the torque-creating current of the z-axis for the entire processing procedure of a workpiece, and FIG. 7 a characteristic line for the drive torque of the main spindle during a single processing operation.

For the realization of the method according to the invention, the data points of the raw signal for each element relating to the respective cases for each machine axis are each stored in a matrix U as shown by way of example in FIG. 5 for an element for an axis. In the exemplary embodiment shown, for seventeen time points from a series of time points, the associated seventeen quotients are shown. Preferably, the quotients are the feed rate in the negative z-direction.

If, following a selection of operating states, exclusively machining processes are to be further analyzed, then on a tool change this is to be identified and eliminated since, for the tool change, some of these conditions could also apply.

The recognizing of a tool change can take place in the method according to the invention by way of a limit value consideration. The limit value is defined as the sum of the empirical mean value of the feed rates ($U_{v,f}(i)$) stored in U and a standard deviation of 50%:

$$\text{Lim}_{v_f} = \frac{\sum_{i=1}^{n} U_{v,f}(i)}{n} \pm \frac{\sqrt{\frac{\sum_{i=1}^{n}(U_{v,f}(i) - \overline{U_{v,f}(i)})^2}{n-1}}}{2} \quad (5)$$

As soon as a data point of the feed rate present in the matrix U exceeds this limit value, it is identified as belonging to the tool change and is set to zero in the matrix U. The indices of the values of the matrix U that are not recognized as a tool change and thus are recognized as belonging to the machining processes, are written in a vector t for the selection of the machining processes in the next step. Thus, the vector t contains only those time points in which the feed rate in the negative z-direction is not equal to 0. By way of the carry-over into the vector t, the spacings (d) of the individual measuring points from one another can be determined:

$$d(i) = t(i+1) - t(i)\{i \in N | 1 \leq i \leq n-1\} \quad (6)$$

This determines the values stored in d. For a coherent measuring signal, d=1. Therefore, by way of the condition b=e+1, the start value (b) of the follow-on machining process and the end value (e) of the current machining process of each individual machining process, which are not immediately identifiable as such in the matrix U shown can be established.

In addition, the possibility exists of also evaluating the temporal sequences of the position change and the speed change quantitatively and therefrom of drawing conclusions regarding the operating state for freely selectable or predetermined time regions. Thus, for example, pulsing variations of the rate changes can indicate a regenerative effect within a time region under observation. With the aid of the method, it is also possible to recognize differences in the rate changes that occur during the same processing step of two identical workpieces, although produced one after the other. From this, indications of the wear of the tool used during this time can result.

Furthermore, the possibility exists in a further method step 106 (FIG. 3) of capturing further internal machine signals, in particular electric current and voltage signals for the drive motors of the machine tool. For this purpose, FIG. 6 shows the torque-creating current for the drive motor responsible for a displacement along the z-axis for the whole procedure of processing of the workpiece. These comprise the individual processing times BZ and the non-productive times NZ that arise.

Figure 7:
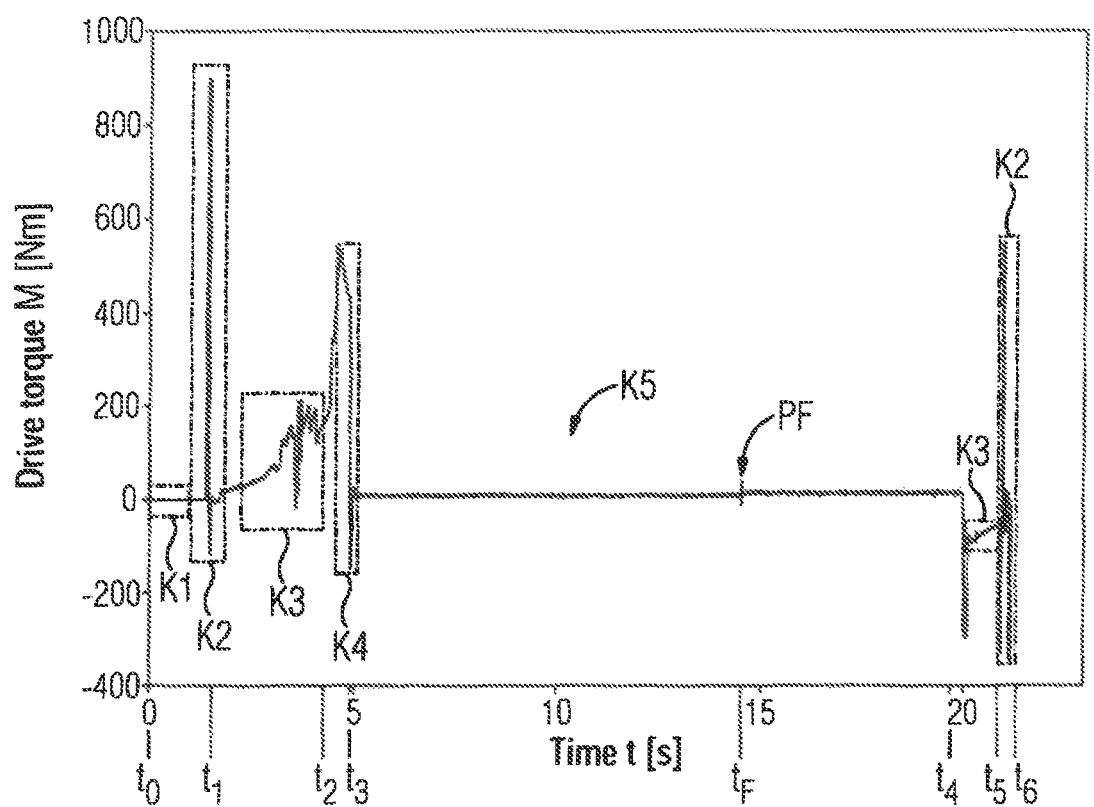

FIG. 7 shows the extract DL from the diagram according to FIG. 6 in a higher temporal resolution. The current variation for driving the main spindle is shown over time and can be subdivided chronologically into a plurality of time portions. During a first time portion K1 between the time point to and the time point $t_1$, the drive is in standstill. Subsequently, a needle-shaped current pulse occurs at the time point $t_1$ as a time portion K2 which is adjoined by a time portion K3 for the drive regulation of the motor, during which the main spindle is moved to the programmed position. At the time point $t_2$ which then arrives, the time portion K4 begins in which the tool WZ reaches the workpiece WS and makes contact. This is the start of cut sequence. The time portion K4 is also relatively short and ends at the time point $t_3$ at which the time portion K5 for the main processing of the workpiece, i.e. the cutting process, follows. It ends at the time point $t_4$. Then a second drive regulation K3 follows between the time points $t_4$ and $t_5$ and a second acceleration effect K2 between $t_5$ and $t_6$.

Thus, in a further method step 106 (FIG. 3) such machine signals can be captured and/or provided and are taken into account in method step 110 for Identification of the state in the method step 110. This opens up the possibility of identifying unprofitable process states such as, for example, standstill times, idling times, tool changes, rapid transverses or the aforementioned override commands. In particular, taking into account the further machine signals enables faulty states to be recognized if, for example, an unexpected change in the current flow occurs (FIG. 7, arrow PF). By this means, the production process can be adapted according to need.

Overall, from the continuing production process, the individual processing procedures can be recognized and established. In addition, the method represents a simple and inexpensive method for online/offline process monitoring during the entire production process.

Although the invention has been illustrated and described in detail by way of the preferred exemplary embodiments, the invention is not restricted by the examples given and other variations can be derived therefrom without departing from the protective scope of the invention.

The invention claimed is:

1. A method for operating a machine tool and processing a workpiece in the machine tool, the method comprising:
   processing the workpiece with the machine tool, and
   identifying an operating state of the machine tool, either offline or online, with a control system of the machine tool by:
   a) for a series of time points $t_i$, detecting positions $p_i$ of a tool of the machine tool or of a tool holder of the machine tool configured to hold the tool, with the positions being expressed as coordinates of a Cartesian coordinate system, wherein at least a position of the tool or of the tool holder is detectable by a sensor as a function of time,
   b) for the series of time points $t_i$, establishing
      b1) a series of position changes $\Delta m_i$ of the tool, of the tool holder or of a preferably rotatable clamping apparatus of the machine tool configured to clamp the workpiece to be processed, in accordance with $$\Delta m_i = \frac{P_i}{P_{i-1}},$$

and
b2) a series of speed changes $\Delta v_i$ the tool, of the tool holder or of the clamping apparatus in accordance with $$\Delta v_i = \frac{v_i}{v_{i-1}}, \text{ wherein}$$

$$v_i = \frac{P_i - P_{i-1}}{t_i - t_{i-1}} \text{ and } v_{i-1} = \frac{P_{i-1} - P_{i-2}}{t_{i-1} - t_{i-2}},$$

determining for the position changes $\Delta m_i$ the respective components $\Delta m_{xi}$, $\Delta m_{yi}$, $\Delta m_{zi}$ and for the speed changes $\Delta v_i$ the respective components $\Delta v_{xi}$, $\Delta v_{yi}$, $\Delta v_{zi}$ in the Cartesian coordinate system, and c) identifying the operating state of the machine tool based on the position changes $\Delta m_i$ and the speed changes $\Delta v_i$,
wherein the operating state of the machine tool represents at least one of a movement of the tool or of the tool holder, a rest phase of the tool or of the tool holder, and a deviation from a predetermined movement speed of the clamping apparatus, and
controlling the machine tool by the control system based on the identified operating state of the machine tool to optimize the processing of the workpiece.

2. The method of claim 1, wherein the operating state represents
d) the movement of the tool and/or the tool holder
d1) for processing the workpiece, in particular for carrying out cutting sequences,
d2) for repositioning the tool, in particular for carrying out return movements, and
d3) for changing the tool,
e) a standstill time or an idle time, or
f) a deviation from override commands.

3. The method of claim 1, further comprising detecting electrical parameters of drive motors of the machine tool using additional sensors.

4. The method of claim 1, further comprising
determining the operating state based on further data, in particular correction factors or tool parameters, provided or established in advance; and
identifying the operating state utilizing the further data.

5. The method of claim 1, further comprising analyzing the series of the position changes $\Delta m_i$ or of the speed changes $\Delta v_i$ based on a limit value consideration.

6. The method of claim 1, further comprising identifying the operating state based on case distinctions, wherein it is tested whether a value for the position change $\Delta m_i$ or for the speed change $\Delta v_i$, or of values of respective components $\Delta m_{xi}$, $\Delta m_{yi}$, $\Delta m_{zi}$ for the position changes $\Delta m_i$ or of respective components $\Delta v_{xi}$, $\Delta v_{yi}$, $\Delta v_{zi}$ for the speed changes $\Delta v_i$ in the Cartesian coordinate system are less than 1, equal to 1, greater than 1, or 0.

7. The method of claim 1, further comprising:
representing the series of position changes $\Delta m_i$ or of the speed change $\Delta v_i$ in a diagram as characteristic lines or in a data array; and
analyzing of the operating state of the machine tool based on the representation.

8. The method of claim 1, further comprising recognizing with the method
g) overloading of one of the drives of the machine tool,
h) wear on the machine tool or on the tool,
i) a production or workpiece fault or
j) process instabilities, in particular rattling (regenerative effect).

9. The method of claim 1, wherein the method is computer-implemented.

10. A machine tool comprising:
a control system configured to carry out a method as set forth in claim 1.

11. A computer-readable non-transitory medium comprising commands which, when executed by a computer, cause the computer to carry out a method as set forth in claim 1.

* * * * *